Dec. 10, 1940.   P. KOLLSMAN   2,224,732
DIRECTIONAL INSTRUMENT
Filed Jan. 31, 1940   2 Sheets-Sheet 1

INVENTOR
PAUL KOLLSMAN
BY  *Gunter Rothke*
his ATTORNEY

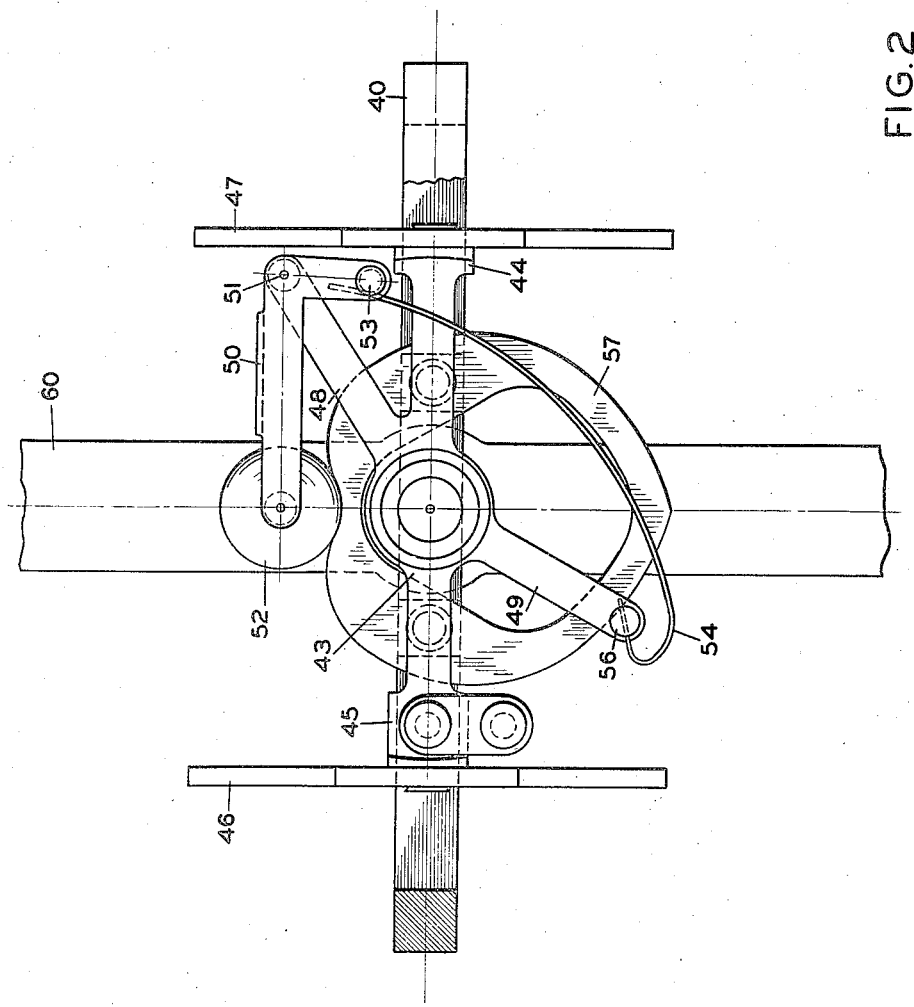

Patented Dec. 10, 1940

2,224,732

UNITED STATES PATENT OFFICE 2,224,732

DIRECTIONAL INSTRUMENT

Paul Kollsman, New York, N. Y.

Application January 31, 1940, Serial No. 316,684

5 Claims. (Cl. 33—223)

This invention relates to improvements in directional instruments, such as direction indicators or instruments serving as a base line for automatic steering for use on craft.

It is an object of this invention to provide an improved directional instrument in which a movable member, for example an indicator, is maintained in its proper direction with great force, but in which the direction maintaining force exerted on the said movable member is greatly diminished should the direction responsive element actuating the movable member deviate from its proper azimuthal position.

This object of the invention may be illustrated by referring to a directional instrument of the magnetic or compass type. In a compass it is desirable to maintain with great force the movable member, for example the compass card or a pointer, in its correct position with respect to the direction of the earth's magnetic field. On the other hand it is desirable that during a period of disturbance of the magnetic element, such as occurs during curves or banking of the plane, the direction maintaining force be greatly diminished as not to deflect the movable element, the pointer or the card, from its correct position.

In other words, it is desirable that upon slight deviation from its proper position a great torque be exerted upon the movable member by the direction maintaining element, the magnet, but that the torque exerted on the movable member be greatly diminished should a substantial relative deviation occur between the position of the directional maintaining element and the movable member.

It is thus an object of this invention to provide, in a directional instrument, a torque limiting and biasing coupling between the movable member and the direction maintaining element capable of exerting a relatively great torque in a range of small relative displacement between the directional element and the movable member and exerting a greatly diminished torque at relative deviations exceeding said predetermined narrow range.

Further aims, objects and advantages of this invention will appear from a consideration of the description which follows with accompanying drawings showing for purely illustrative purposes an embodiment of this invention. It is to be understood, however, that the description is not to be taken in a limiting sense, the scope of this invention being defined in the appended claims.

Referring to the drawings:

Fig. 2 shows on an enlarged scale a detail of the device shown in Fig. 1, section being taken on line 2—2.

Figure 1:
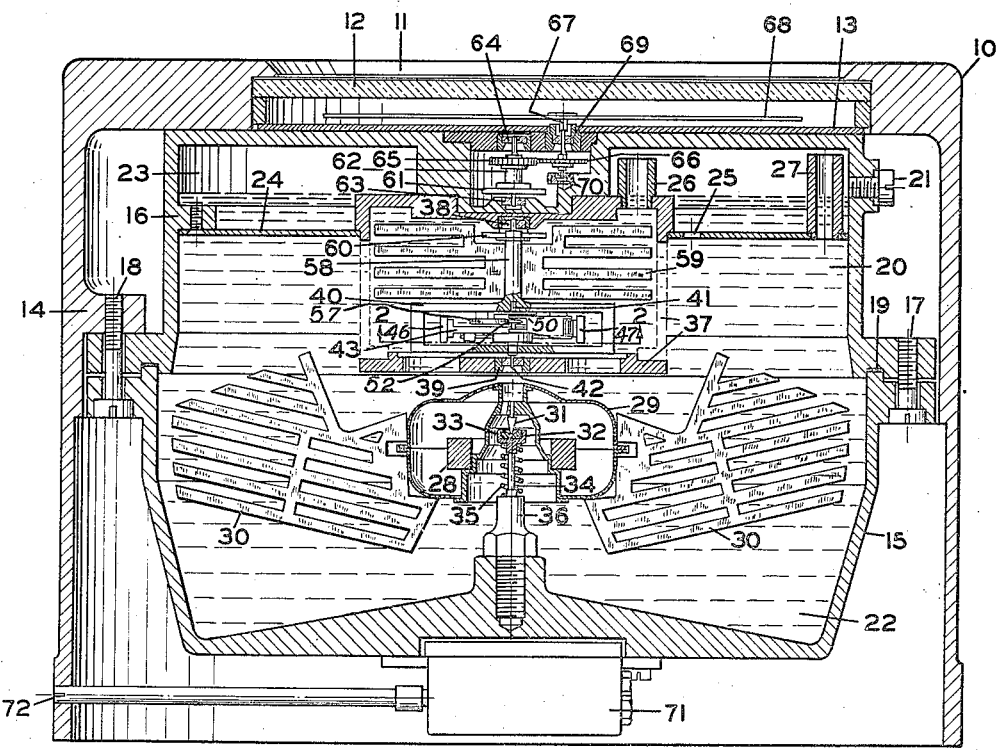
Fig. 1 shows a vertical cross-section through a compass according to the present invention.

An instrument housing 10 is provided with an aperture 11 closed by a cover glass 12 through which there is visible a dial 13 of an instrument inserted into the housing. The housing is provided with internal lugs 14 for the mounting therein of an instrument casing, in the illustrated embodiment, a compass bowl.

The compass bowl consists of a lower portion 15 and an upper portion 16 held tightly together by means of screws 17 and 18 and sealed by means of a gasket 19. The screw 18 is shown as extending through flanges in the upper and lower portions of the compass bowl and screwed into the internal lug 14 of the housing.

The compass bowl may be filled with a charge of damping liquid 20, a filling aperture being provided at 21 normally closed by means of a screw. The space inside the wall is divided by means of a partition 24 into two chambers, a lower chamber 22 and an upper chamber 23, the lower chamber being filled with liquid and the upper chamber serving as an expansion chamber permitting of expansion and contraction of the liquid due to changes in temperature.

The liquid in the expansion chamber 23 communicates with the liquid in the lower chamber through apertures 25 in the partition 24 while the lower chamber 22 is vented to the upper chamber by means of short conduits 26 and 27 to permit the escape of gas or air bubbles into the expansion chamber.

A directional maintaining element is shown in the illustrated embodiment as being a directional magnet 28 enclosed in a float 29 provided with damping fins 30. The float rests with a point 31 in a jewel bearing 32 mounted in a cup shaped upper portion 33 of a stem 34 resiliently supported by means of a spring 35 in a sleeve 36 screwed into the bottom of a bowl.

For operating a movable member, in the illustrated embodiment a pointer, a coupling is provided capable of transmitting a substantial torque within a limited range of relative deviation of the directional element and the movable member and exerting a greatly diminished torque in a range of relative deviation in excess of said limited predetermined range.

In the illustrated embodiment, the coupling utilizes the resilient force of the spring modified by a cam arrangement which will now be described.

A supporting member 37 is shown as secured to the upper portion of the compass bowl. Within the supporting member there is mounted in bearings 38 and 39 coaxially arranged with the pivot of the directional magnet, the frame 40. Within the frame there is movable in pivots 41 and 42 a support 43 carrying on arms 44 and 45 follower magnets 46 and 47. The directional magnet 28 and the follower magnets 46 and 47 may be of the type disclosed in my Patent No. 2,206,506 issued July 2, 1940 (application Ser. No. 217,904 filed July 7, 1938).

A support is further provided with two arms 48 and 49, the arm 48 carrying a bell crank lever 50 pivoted thereto at 51. The bell crank lever carries a roller 52 on one end and is provided with a stud 53 on the other against which bears the free end of a spring 54 secured to the arm 49 at 56. The bell crank lever has a tendency of moving the roller 52 towards the central axis of the device.

To the frame 40 there is secured a cam 57 against the circumference of which the roller 52 bears. The cam is preferably of heart-shaped form eccentrically mounted and provided with an indentation in which normally the roller comes to rest. In the proximity of the indentation, the curvature of the cam is steep within a limited range gradually changing into a flat portion towards a point opposite of the aforementioned indentation.

Either the frame carrying the cam or the support carrying the roller may be regarded as driving or driven parts of the coupling.

Upon small deviations of the roller with respect to the central portion of the indentation, the bell crank lever is turned a considerable amount per degree of displacement thus causing the spring to offer considerable resistance to such displacement.

If, however, the relative displacement exceeds said predetermined limited range as to move the roller onto the flat portion of the cam, the increase of resistance offered by the spring per degree of relative displacement is relatively small thus causing a small centralizing torque to be exerted between the two movable elements.

In the illustrated embodiment, the frame 40 is shown as provided with a shaft extension 58 to which there may be secured damping fins 59 to provide individual damping for the movable element, in the illustrated embodiment, a pointer.

For transmitting the movement of the frame located within the liquid filled bowl to the pointer located outside, there is shown a magnetic coupling consisting of a pair of magnets 60 and 61. The magnet 60 is secured to the shaft extension 58 while the magnet 61 is carried by a shaft 62 coaxial with the axis of the frame 40.

The shaft 62 is mounted in bearings 63 and 64 and carries a gear 65. The gear 65 forms an element of a gear train 65, 66, the second gear 66 being mounted on a shaft 67 carrying a pointer 68. The pointer shaft is shown as mounted in bearings 69 and 70.

In the illustrated embodiment a reversing gear is employed to permit of the use of a pointer in connection with the standard form of compass card in which the north and south marks appear on the top and bottom and the east and west marks on the right and left hand side respectively.

A conventional compensating mechanism providing magnetic compensation of the compass is shown in the illustrated embodiment at 71 operable from the outside by means of two shafts, one of which is visible at 72. The operation of the device is as follows:

The directional magnet 28 which is preferably made of considerable pole strength will normally maintain its correct north south position with great stability. The stability of the directional magnet, moreover, is increased by the damping fins 30 secured to the compass float.

If a small deviation should occur between the pointer or the frame 40 connected therewith and the directional magnet, a substantial correcting torque is exerted upon the pointer to correct its position. The pointer itself is steadied by means of the damping fins 59 which are independent of the damping fins 30 of the directional magnet.

If during a flight in a curve or due to acceleration forces the directional magnet should be substantially deviated from its correct position, the pointer will not immediately follow the directional magnet due to the pointer damping means. Accordingly, a substantial deviation will occur between the directional magnet and the pointer causing the parts of the coupling to assume a position in which only a very small centralizing or correcting torque is transmitted from the directional magnet to the pointer.

The pointer will thus maintain its correct position or deviate only slightly although the powerful directional magnet has deviated a substantial amount from its correct position. If the directional magnet returns to its proper position, the elements of the coupling will again assume a position in which a substantial torque is exerted on the pointer thus correcting for small deviations which may have occurred in the meantime.

The hereinbefore described instrument thus has the feature of maintaining the movable element or indicating means in its correct position by means of a great direction maintaining force or torque during normal operation of the compass. During temporary disturbances as would interfere with the normal operation of the compass, the controlling torque of the directional element is greatly diminished thus preventing the indicating means from being deflected out of its proper position. Thus a direction indicator is obtained providing very steady indication under conditions of flight which normally would disturb the proper functioning of the instrument.

Obviously the present invention is not restricted to the particular embodiments herein shown and described. Moreover, it is not indispensable that all the features of this invention be used conjointly as they may advantageously be employed in various combinations and subcombinations.

What is claimed is:

1. In a compass, the combination with a directional magnet, and indicating means; of a torque limiting and biasing coupling between said magnet and said indicating means, said coupling including a first and a second rotatable member; a heart shaped cam on said first member; a roller engaging said cam, said roller being mounted on said second member; and means for urging said roller against said cam.

2. In a compass, the combination with a directional magnet, and indicating means movable relatively to said directional magnet; of first damping means associated with said directional magnet; second damping means associated with said indicating means; and a torque limiting and biasing coupling between said magnet and said indicating means, said coupling including a first and a second rotatable member; a heart shaped cam on said first member; a roller engaging said cam, said roller being mounted on said second member; and means for urging said roller against said cam.

3. A compass comprising, in combination, a compass casing; a charge of liquid therein; a directional magnet mounted in said casing for movement in azimuth; first damping means movable by said magnet and acting on said liquid; indicating means; second damping means movable with said indicating means and acting on said liquid; and a resilient spring coupling connecting said directional magnet and said indicating means, moving equiangularly therewith and tending to maintain said indicating means in alignment with said magnet, said coupling comprising a first member connected to said magnet, a second member movable relatively to said first member and connected to said indicating means, a spring connected to one of said members, and means associated with said spring and controlled by the relative position of said members for transmitting to said other member from said spring a restoring torque, the restoring torque increasing to a maximum for small amounts of misalignment between said members and then gradually decreasing with an increase in misalignment towards a position of 180° of misalignment.

4. A compass comprising, in combination, a compass casing; a charge of liquid therein; a directional magnet mounted in said casing for movement about, and tilt relatively to, the azimuth axis; first damping means movable with said magnet and acting on said liquid; a follower magnet mounted in said casing for rotation about an axis coaxial with the axis of rotation of said directional magnet; indicating means; second damping means movable with said indicating means; and a torque limiting and biasing coupling between said indicating means and said follower magnet moving equiangularly therewith and tending to maintain said indicating means in alignment with said follower magnet, said coupling including a first and a second rotatable member; a heart-shaped cam on said first member; a lever pivotally mounted on said second member; a roller mounted on said lever; and a spring acting on said lever for maintaining said roller in contact with said cam.

5. In a compass, the combination with a directional magnet, and indicating means; of a resilient coupling, comprising a first member connected to said magnet, a second member movable relatively to said first member and connected to said indicating means, a spring connected to one of said members, and means associated with said spring and controlled by the relative position of said members for transmitting to said other member from said spring a restoring torque, the restoring torque increasing to a maximum for small amounts of misalignment between said members and then gradually decreasing with an increase in misalignment towards a position of 180° of misalignment.

PAUL KOLLSMAN.